US009037354B2

(12) United States Patent
Mondragon et al.

(10) Patent No.: US 9,037,354 B2
(45) Date of Patent: May 19, 2015

(54) CONTROLLING VEHICLE ENTERTAINMENT SYSTEMS RESPONSIVE TO SENSED PASSENGER GESTURES

(75) Inventors: Christopher K. Mondragon, Laguna Niguel, CA (US); Brett Bleacher, Rancho Santa Margarita, CA (US); William W. Allen, Mission Viejo, CA (US); David Reichert, Orange, CA (US)

(73) Assignee: Thales Avionics, Inc., Irvine, CA (US)

( * ) Notice: Subject to any disclaimer, the term of this patent is extended or adjusted under 35 U.S.C. 154(b) by 295 days.

(21) Appl. No.: 13/605,137

(22) Filed: Sep. 6, 2012

(65) Prior Publication Data
US 2013/0066526 A1 Mar. 14, 2013

Related U.S. Application Data

(60) Provisional application No. 61/532,875, filed on Sep. 9, 2011.

(51) Int. Cl.
*G09G 5/00* (2006.01)
*G06K 9/00* (2006.01)
(Continued)

(52) U.S. Cl.
CPC .............. *G09G 5/00* (2013.01); *G06K 9/00335* (2013.01); *G06F 3/017* (2013.01); *B64D 11/0015* (2013.01); *B64D 47/08* (2013.01); *B60N 2/002* (2013.01)

(58) Field of Classification Search
CPC .... B64D 11/00; B64D 11/0015; B64D 11/06; B64D 2011/0053; B64D 2011/0061; B64D 2011/06; B64D 2011/0603; B64D 2011/0606; B64D 2011/0613; B64D 2011/0617; B64D 2011/062; B64D 2011/0637; B64D 2011/0641; B64D 2011/0648; B64D 2011/0651; B64D 2011/0658; B64D 2011/0665; B64D 2011/0668; B64D 2011/0675; B64D 2011/0679; B64D 47/00; B64D 47/02; B64D 47/08; B60N 2/00; B60N 2/002; B60N 2/02; B60N 2/0224; B60N 2/0296; B60N 2/04; B60N 2/24; B60N 2/56; G06F 3/00; G06F 3/005; G06F 3/01; G06F 3/011; G06F 3/012; G06F 3/013; G06F 3/014; G06F 3/017; G06K 9/00335; G06K 9/00342; G06K 9/00348; G06K 9/00355; G06K 9/00362; G06K 9/00369; G06K 9/00375; G06K 9/00382; G06K 9/00389; G06K 2009/00362; G06K 2009/00395
USPC .................................................. 701/3, 48, 49
See application file for complete search history.

(56) References Cited

U.S. PATENT DOCUMENTS
5,594,469 A   1/1997 Freeman et al.
5,701,058 A   12/1997 Roth
(Continued)

FOREIGN PATENT DOCUMENTS
WO    WO 2004/045399 A1    6/2004
WO    WO 2010/141403 A1    12/2010

OTHER PUBLICATIONS
International Preliminary Report on Patentability, Application No. PCT/US2012/053954; Dec. 5, 2013.
(Continued)

*Primary Examiner* — Jerrah Edwards
(74) *Attorney, Agent, or Firm* — Myers Bigel Sibley & Sajovec, P.A.

(57) ABSTRACT

A vehicle entertainment system is controlled responsive to gestures that are formed by a passenger of the vehicle. The vehicle entertainment system includes a display device, at least one gesture control camera, and a processor. The gesture control camera generates a camera signal responsive to light reflected from at least one object within a field of view of the at least one gesture control camera. The processor analyzes the camera signal to identify a gesture made by a passenger moving the at least one object, and controls at least one operation of the vehicle entertainment system responsive to the identified gesture.

17 Claims, 11 Drawing Sheets

(51) Int. Cl.
    *G06F 3/01*     (2006.01)
    *B64D 47/08*     (2006.01)
    *B64D 11/00*     (2006.01)
    *B60N 2/00*     (2006.01)

(56) References Cited

U.S. PATENT DOCUMENTS

| | | |
|---|---|---|
| 6,002,808 A | 12/1999 | Freeman |
| 6,152,563 A | 11/2000 | Hutchinson et al. |
| 6,373,961 B1 | 4/2002 | Richardson et al. |
| 7,058,204 B2 | 6/2006 | Hildreth et al. |
| 7,176,899 B2 | 2/2007 | Nagasaka et al. |
| 2005/0046755 A1 | 3/2005 | Hattori et al. |
| 2006/0050014 A1 | 3/2006 | Yoon |
| 2007/0195997 A1 | 8/2007 | Paul et al. |
| 2007/0268246 A1 | 11/2007 | Hyatt |
| 2008/0129707 A1 | 6/2008 | Pryor |
| 2008/0136839 A1* | 6/2008 | Franko et al. ............... 345/634 |
| 2009/0102788 A1 | 4/2009 | Nishida et al. |
| 2009/0109036 A1* | 4/2009 | Schalla et al. ............. 340/573.1 |
| 2009/0278915 A1* | 11/2009 | Kramer et al. ................. 348/48 |
| 2010/0208206 A1 | 8/2010 | Connell, II |
| 2011/0050589 A1* | 3/2011 | Yan et al. ...................... 345/173 |
| 2011/0068227 A1* | 3/2011 | Kneller et al. .............. 244/118.6 |
| 2011/0080490 A1 | 4/2011 | Clarkson et al. |
| 2011/0099588 A1 | 4/2011 | Ashton |
| 2011/0123183 A1 | 5/2011 | Adelsberger et al. |
| 2011/0148930 A1 | 6/2011 | Lee et al. |
| 2011/0274405 A1* | 11/2011 | Godar .......................... 386/224 |

OTHER PUBLICATIONS

International Search Report Corresponding to International Application No. PCT/US2012/053954; Date of Mailing: Dec. 10, 2012; 12 Pages.

International Search Report Corresponding to International Application No. PCT/US12/53934; Date of Mailing: Nov. 19, 2012; 11 Pages.

\* cited by examiner

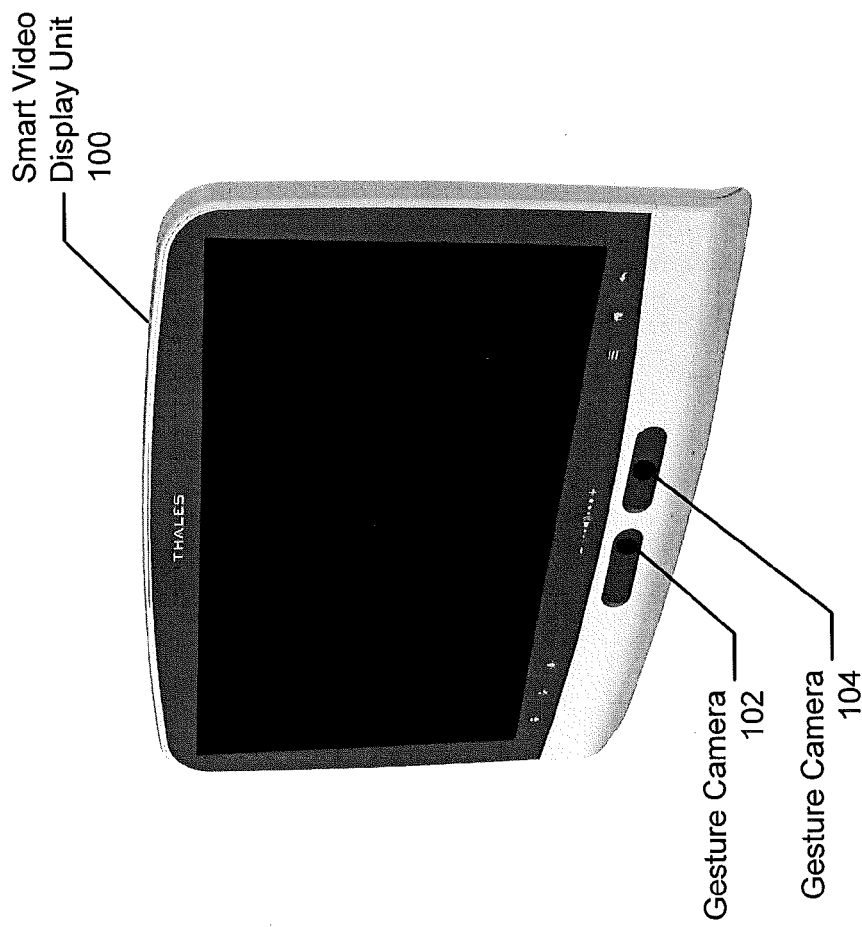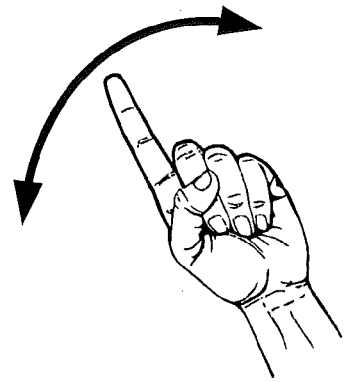
*FIGURE 1*

CONTROLLING VEHICLE ENTERTAINMENT SYSTEMS RESPONSIVE TO SENSED PASSENGER GESTURES

CROSS REFERENCE TO RELATED APPLICATION

This application claims the benefit of U.S. Provisional Application No. 61/532,875, filed Sep. 9, 2011, the entire content of which is incorporated herein by reference.

TECHNICAL FIELD

Embodiments described herein relate generally to electronic entertainment systems and, more particularly, to man-machine interfaces for controlling entertainment systems.

BACKGROUND

The approaches described in this section could be pursued, but are not necessarily approaches that have been previously conceived or pursued. Therefore, unless otherwise indicated herein, these approaches are not known to be prior art and are not admitted to be prior art by inclusion in this section.

Automated gesture recognition has been the subject of considerable study since 1995. One objective of gesture recognition was control of machines, as described in U.S. Pat. No. 5,594,469 to Freeman et al entitled HAND GESTURE MACHINE CONTROL SYSTEM. The approach used by Freeman et al. was to have a hand gesture in space cause movement of an on-screen displayed hand icon over an on-screen displayed machine control icon. The hand icon moved the machine control icon to effectuate machine control.

In U.S. Pat. No. 6,002,908 to Freeman entitled HAND GESTURE CONTROL SYSTEM, hand gestures are sensed optically through use of a camera, and converted into a digital representation based on horizontal and vertical position of the hand, length and width of the hand, and orientation of the hand.

In U.S. Pat. No. 7,058,204 to Hildreth et al. entitled MULTIPLE CAMERA CONTROL SYSTEM, a multi-camera technology is described, whereby a person can control a screen by pointing a finger.

Gesture recognition has many advantages over various physical interfaces, such as a touch screen displays, switches, mouse devices, keypads, and keyboards for controlling electronic systems. Physical interfaces need to be positioned within the convenient reach of a person. When physical interfaces are intended for use in a public setting, hygiene problems can arise in that the system may become unsanitary or unattractive to users. Moreover, physical interfaces are subject to wear, which can diminish their useful life and increase maintenance costs. Furthermore, there is the potential for abuse and damage from vandalism to physical interfaces.

SUMMARY

Various embodiments of the invention disclosed herein are directed to a vehicle entertainment system that is controlled responsive to gestures that are formed by a passenger of the vehicle.

In one embodiment, the vehicle entertainment system includes a display device, at least one gesture control camera, and a processor. The gesture control camera generates a camera signal responsive to light reflected from at least one object within a field of view of the at least one gesture control camera. The processor analyzes the camera signal to identify a gesture made by a passenger moving the at least one object, and controls at least one operation of the vehicle entertainment system responsive to the identified gesture.

Further embodiments are directed to operations and methods for identifying different gestures and commands that can be triggered by various gestures to control the vehicle entertainment system and/or other defined components/systems within a vehicle. The vehicle entertainment system may compensate for the effects of turbulence or other vehicle accelerations on the object that is being moved by the passenger to form a gesture.

Some further embodiments are directed to controlling the vehicle entertainment system and/or other defined components/systems within a vehicle responsive to an identified level of alertness of the passenger.

Some further embodiments are directed to configuring a pair of gesture control cameras to form a more narrow field of view in which gestures may be more accurately identified, while ignoring movement that occurs outside that field of view.

BRIEF DESCRIPTION OF THE DRAWINGS

The accompanying drawings, which are included to provide a further understanding of the disclosure and are incorporated in and constitute a part of this application, illustrate certain non-limiting embodiments of the invention. In the drawings:

FIG. 1 illustrates a smart video display unit of a vehicle entertainment system, the smart video display unit has a gesture recognition interface configured according to some embodiments of the present invention;

DETAILED DESCRIPTION

The following detailed description discloses various non-limiting example embodiments of the invention. The invention can be embodied in many different forms and is not to be construed as limited to the embodiments set forth herein.

Various embodiments of the present invention may arise from the present realization that In-Flight Entertainment (IFE) systems can be difficult to control using touch-screen interfaces that are part of a seatback video display unit. When touch-screen interfaces are placed in seatbacks of premium and business class seating of an aircraft, the touch-screen interfaces can be located too far away from the facing passengers to be conveniently reached. Moreover, touch-screen interfaces in seatbacks of coach class seating can be difficult to reach when the passengers' seats are reclined.

Figure 2:
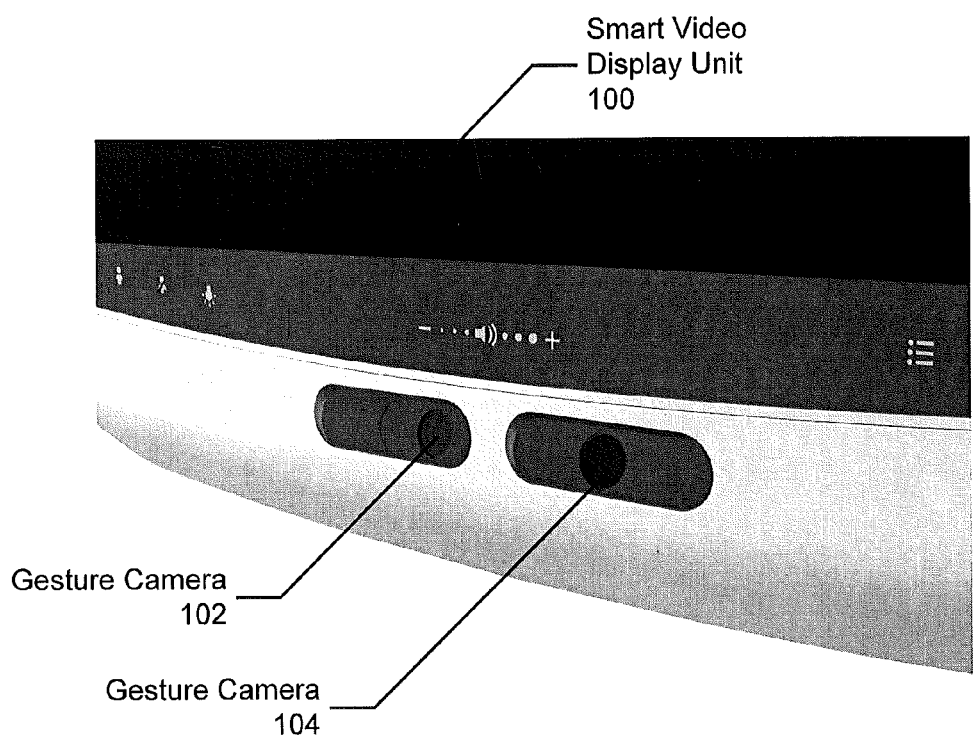
FIG. 2 illustrates an enlarged view of a portion of the smart video display unit of FIG. 1 which contains two gesture control cameras that are configured according to some embodiments of the present invention.

To overcome these and other problems, various embodiments of the present invention are directed to providing a vehicle entertainment system, which for non-limiting convenience of reference is referred to herein as a Smart Video Display Unit (SVDU). The SVDU is configured to be controlled using gestures performed by a person who is seated in close proximity to the SVDU. The SVDU may be further configured to control other defined components/systems within the aircraft responsive to sensing defined gestures. FIG. 1 illustrates a SVDU 100 that has a gesture recognition interface that includes a pair of gesture control cameras 102 and 104, and is configured according to some embodiments of the present invention. FIG. 2 illustrates an enlarged view of a portion of the SVDU 100 of FIG. 1.

The cameras 102 and 104 and associated circuitry can sense and identify gestures that are made using, for example, a finger(s), a hand(s), an arm(s), a face, an eye(s), mouth, head or body motion, and can use an identified gesture to select among a library of commands to control the SVDU 100 and/or other defined components/systems within the aircraft. Further operation of the SVDU 100 is explained below.

Although embodiments herein are primarily described in the context of IFE systems, the invention is not limited thereto. Instead, embodiments may be used in other types of gesture controlled systems which, for example, may be used in trains, automobiles, buses, homes, cruise ships, commercial/military transport aircraft, or other environments. Moreover, although various embodiments are described which use two cameras 102 and 104, the invention is not limited thereto. Some embodiments may be used with any number of cameras. Thus, for example, one of the cameras 102 and 104 illustrated in FIG. 1 may be eliminated or replaced with a light source. The light source may be an infrared light source to allow illumination of a passenger facing the SVDU 100 without objectionably shining visible light into the passenger's eyes.

Figure 3:
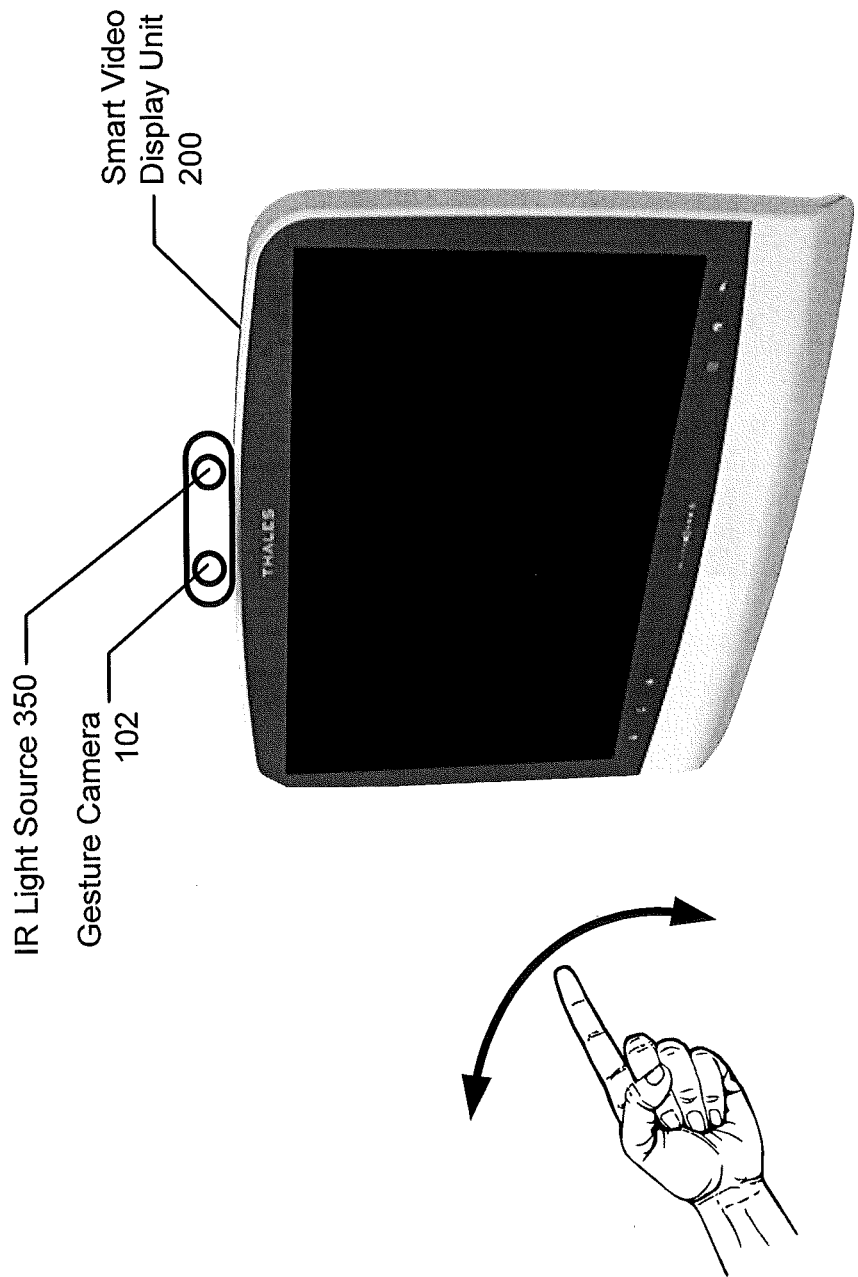
FIG. 3 illustrates another smart video display unit of a vehicle entertainment system, the smart video display unit has a gesture recognition interface that is connected to, but separately packaged from, the smart video display unit, according to some embodiments of the present invention.

The one or more cameras may be located elsewhere than as shown in FIG. 1, such as in an upper portion of the housing of the SVDU 100 or as a separately packaged device that is positioned to view a passenger's body who is seated facing the SVDU 100. For example, FIG. 3 illustrates another smart video display unit 200 of a vehicle entertainment system. The vehicle entertainment system has a gesture recognition interface, including a single gesture camera 102 and an infrared light source 350, that is connected to but separately packaged from the smart video display unit 200.

Figure 8:
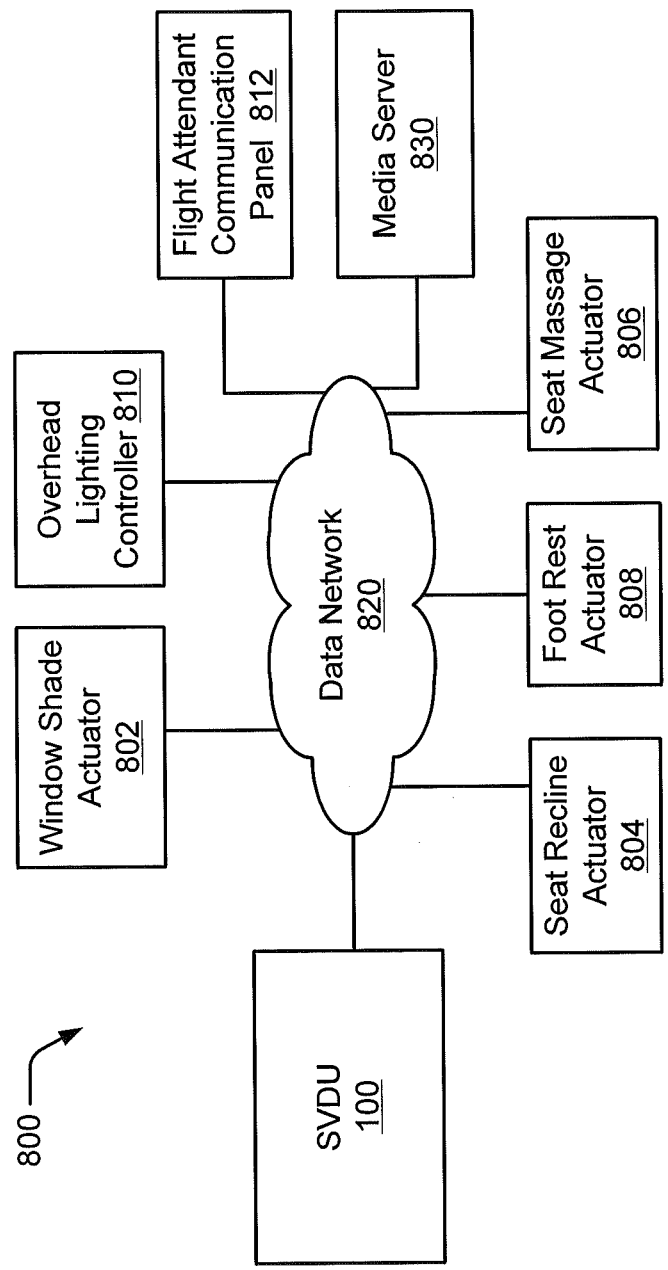
FIG. 8 is a block diagram of a smart video display unit integrated into an aircraft entertainment system and which controls various actuators, communicates with a flight attendant communication panel, and controls a media server.

Example Vehicle Entertainment System and SVDU:

FIG. 8 is a block diagram of a SVDU 100 that is integrated into an aircraft entertainment system 800 and configured to enable a passenger to use gestures to control various actuators, communicate with a flight attendant communication panel, and control a media server 830. FIG. 3 is a block diagram of example components that may be included in the SVDU 100 of FIGS. 1, 2, and 8, or another vehicle entertainment system, according to some embodiments.

Referring to FIG. 8, although a single SVDU 100 and various controlled actuators are illustrated for simplicity, it is understood that any number of SVDUs 100 and controlled actuators may be included in the aircraft entertainment system 800. For example, a plurality of the SVDUs 100 may be configured as seatback display units, with each SVDU 100 being integrated into a different one of a plurality of passenger seats, which are arranged in rows, and the SVDUs 100 can be each be arranged to face a different passenger seated in an adjacent row.

The SVDU 100 is communicatively connected through a data network (e.g., wired (e.g., Ethernet) network and/or wireless local area network) to a media server 830, a flight attendant communication panel 812, and various actuators that may include a window shade actuator 802, a seat recline actuator 804, a seat massage actuator 806, a foot rest actuator 808, and an overhead lighting controller 810. The media server 830 contains video and/or audio media (e.g. movies, television shows, music, audio books, games, etc.) that can be delivered on-demand to a particular SVDU 100 and/or broadcast to a plurality of SVDUs 100. The flight attendant communication panel 812 can be a computer interface that can receive passenger messages sent by the SVDU 100 and can send messages to a particular SVDU 100 and/or broadcast messages to a plurality of SVDUs 100.

The window shade actuator 802 is configured to open and close (e.g., raise and lower) a window shade that is adjacent to the passenger seat facing the SVDU 100 (e.g., adjacent to a window seat of a row of seats in an aircraft). The seat recline actuator 804 is configured to regulate a recline angle (e.g., powered recline) of the passenger seat facing the SVDU 100. The seat massage actuator 806 is integrated into the passenger seat facing the SVDU 100 to provide massage motions against a seated passenger. The foot rest actuator 808 is configured to move a footrest connected to the passenger seat facing the SVDU 100. The overhead lighting controller 810 is configured to control the brightness of overhead lighting (e.g., one or more lighting devices) for the passenger seat facing the SVDU 100.

Figure 4:
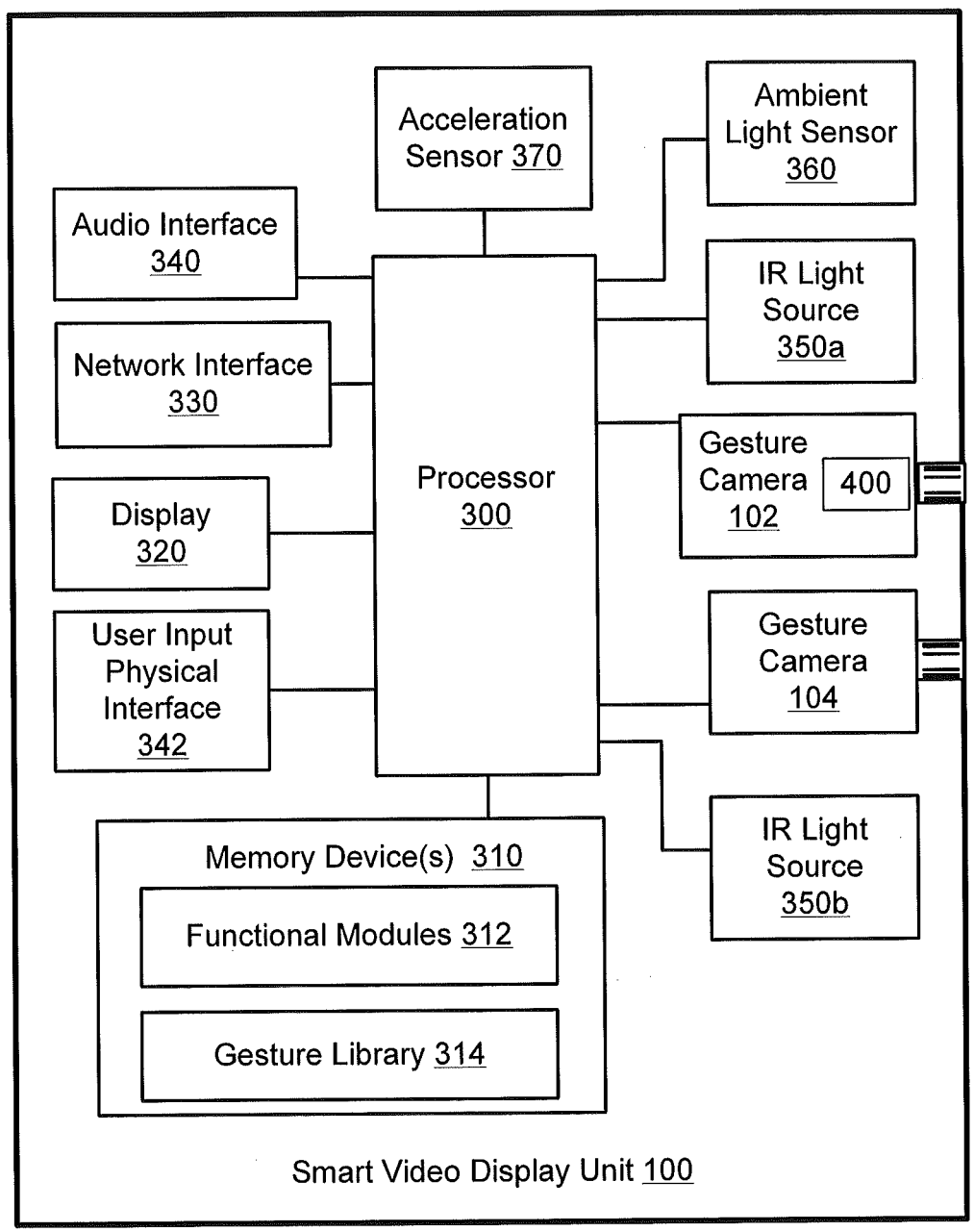
FIG. 4 is a block diagram of components that may be included in the smart video display unit of FIG. 1 and configured to operate according to some embodiments of the present invention.

Referring to FIG. 4, an example SVDU 100 includes a processor 300, memory device(s) 310 that contain functional modules 312, the gesture cameras 102 and 104, a display device 320 (e.g., a liquid crystal display which may include a touch-sensitive interface), an audio interface 340, and/or a wired or wireless network interface 330. The SVDU 100 may further include a physical interface 342 (e.g., switches, control wheels, buttons, keypad, keyboard, etc.) that can be manipulated by a passenger (user) to control the SVDU 100 and other defined components/systems within the aircraft or other vehicle.

The processor 300 includes one or more data processing circuits, such as a general purpose and/or special purpose processor (e.g., microprocessor and/or digital signal processor). The processor 300 may, for example, include a general purpose processor that functions to manage and control the SVDU 100, and a digital signal processor that functions to identify gestures indicated in the video signal of one or more cameras. The processor 300 is configured to execute computer program instructions from the functional modules 312 in the memory device(s) 310, described below as a computer readable medium, to perform some or all of the operations and methods that are described herein for one or more of the embodiments.

The processor 300 may receive music, video, games, data, and application programs through the network interface 330, which it processes for display on the display device 320 and/or for output as audio through the audio interface 340 to, for example, a headphone jack attached to an armrest of the passenger's seat. The music, video, games, data, and application programs may be received from a network connected to the media server 830 that is configured to respond to on-demand requests generated by the passenger through defined gestures that are identified by the processor 300.

The memory 310 may contain a library 314 of defined gestures and associated commands. The gestures may be defined by shapes that can be formed by a passenger moving a single object or a plurality of objects (e.g., finger(s), hand(s), arm(s), eye(s), mouth, etc.). The cameras 102 and 104 generate a camera signal responsive to light reflected from at least one object within a field of view of the at least one gesture control camera. The processor 300 can track movement of the at least one object as indicated by the camera signal from the cameras 102 and 104.

Figure 9:
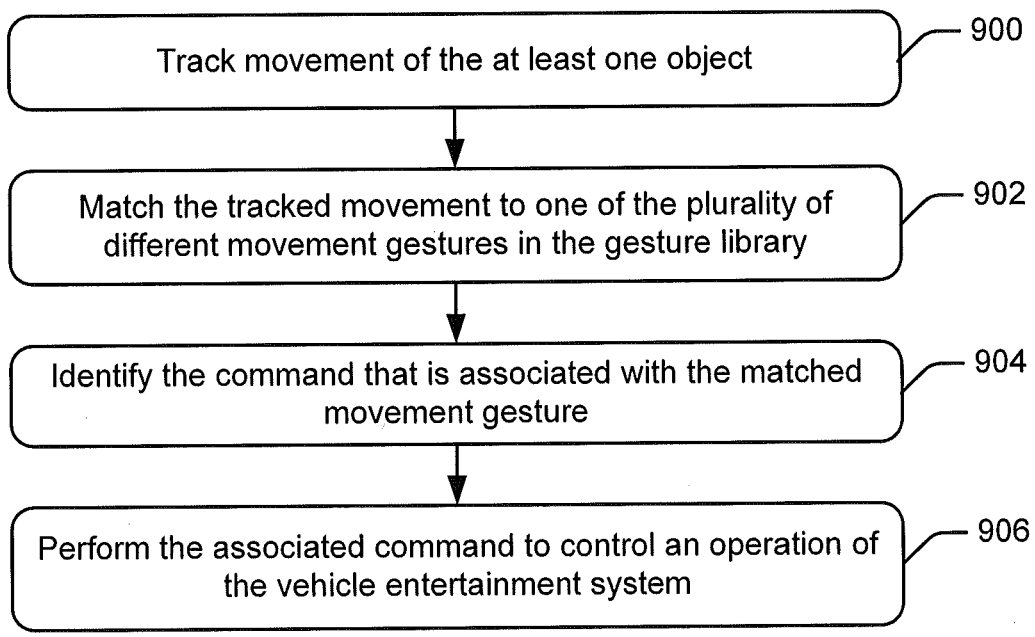
FIGS. 9-13 are flowcharts of operations and methods that can be performed by a vehicle entertainment system.

FIG. 9 is a flowchart of operations and methods that can be performed by the processor 300 to identify gestures using the gesture library 314. The processor 300 tracks (block 900) movement of one or more objects that are viewed by the cameras 102,104. The processor 300 attempts to match (block 902) the tracked movement to one of the plurality of different movement gestures in the gesture library to identify a corresponding command. When a match is identified to one of the movement gestures in the gesture library 314, the associated command in the gesture library 314 is identified (block 904). The identified command is then performed (block 906) to control an operation of the SVDU 100 and/or other defined components/systems within the aircraft.

Although the gesture control camera 102 is illustrated in FIG. 4 as being within the SVDU 100, it may instead by communicatively connected to, but separately packaged from, the smart video display unit 100. A separately packaged gesture control camera 102 may include an internal co-processor 400 that is configured to pre-analyze the video signal to, for example, identify objects within the video signal to generate object location information that can be used by the main processor 300 to identify a gesture made by a passenger. The co-processor 400 may additionally be configured to track movement of one or more identified objects within the video signal to generate object motion information that can be used by the main processor 300 to identify a gesture made by a passenger. The co-processor 400 may therefore perform one or more of the operations illustrated in one or more of FIGS. 9-13, to offload at least some of the gesture identification processing burden from the main processor 300.

Although various embodiments are described in the context of using a pair of cameras, a single camera or more than two cameras may instead be used.

Example Control Operations and Associated Gestures:

Various gestures that the processor 300 may be programmed to identify can include, but are not limited to, a location on the display 320 where a finger(s) or hand(s) is pointed, swiping motions at defined angles made by a finger(s) or hand(s) relative to the display 320, changing distances between two or more fingers or between hand(s) that are held in front of the SVDU 100, and/or rotation of two or more fingers or hands in front of the SVDU 100.

For example, the processor 300 may respond to detection of a finger pinch (e.g., by a single finger curling and/or by decreasing distance between two or more fingers) by operating to shrink and/or compress one or more items displayed on the display device 320. The processor 300 may respond to detection of a finger expansion (e.g., by a single finger uncurling and/or by increasing distance between two or more fingers) by operating to enlarge and/or decompress one or more items displayed on the display device 320. Detection of a hand that is opening may cause the processor 300 to open a menu item (e.g., to display a lower level of sub-menu items associated with the menu item), and detection of a hand that is closing may cause the processor 300 to close a menu item (e.g., to display a higher level menu that includes an item associated with the menu item).

The processor 300 may further utilize facial recognition algorithms to identify and respond to the passenger's facial gestures, movement of one or both eyes, and/or mouth (e.g., detection of lips moving, identification of words formed by lip movements, etc.).

Various additional commands that the processor 300 may associate with defined gestures and selectively perform to control the SVDU 100 and other defined components/systems within the aircraft may include, but are not limited to:

1) selecting among displayed menu items;
2) selecting among displayed movies or other media programs;
3) selecting among applications;
4) controlling audio volume;
5) controlling playing, pausing, fast forward/rewind of a selected movie or other media that is being streamed from the media server 830 to the SVDU 100;
6) controlling a game or other application being executed by the SVDU 100;
7) controlling seat actuator functions (e.g., seat recline angle, massage actuators, foot rest position, etc.);
8) controlling window shade positioning (e.g., open/close shade);
9) control overhead lighting for the seat;
10) control passenger service functions;
11) trigger communication of requests/responses to flight attendants; and/or
12) sense object movement along one or more axes (e.g., 3 orthogonal axes) and provide the sensed movement as a control input to an application executed by the processor 300 and/or another processor within the vehicle.

In some embodiments, a passenger may scroll in a defined direction through a list of displayed menu items by swiping a hand or finger in a corresponding direction relative to the SVDU 100. The passenger may select a particular one of the displayed menu items by pointing a finger at the corresponding location of the menu item on the display 320. The processor 300 may move a cursor displayed on the display 320 that track locations where the passenger is pointing, and may select a menu item or other selectable object on the display 320 when the cursor dwells on the item/object for a threshold time or when the passenger performs a defined gesture relative to the item/object (e.g., draws a check mark on or circles the menu item). The passenger may thereby steer the cursor to the desired menu item by moving a finger, and then select the desired menu item by dwelling on it for at least the threshold time, or by moving the finger to draw a check mark, circle, or other defined shape on the menu item.

In some other embodiments, the processor 300 is configured to identify a level of activity or alertness of a passenger by observing movement of the passenger's hands, arms, eyes, mouth, or other body movements. The processor 300 may detect facial expressions using facial recognition algorithms to determine the passenger's alertness and/or mood.

Figure 10:
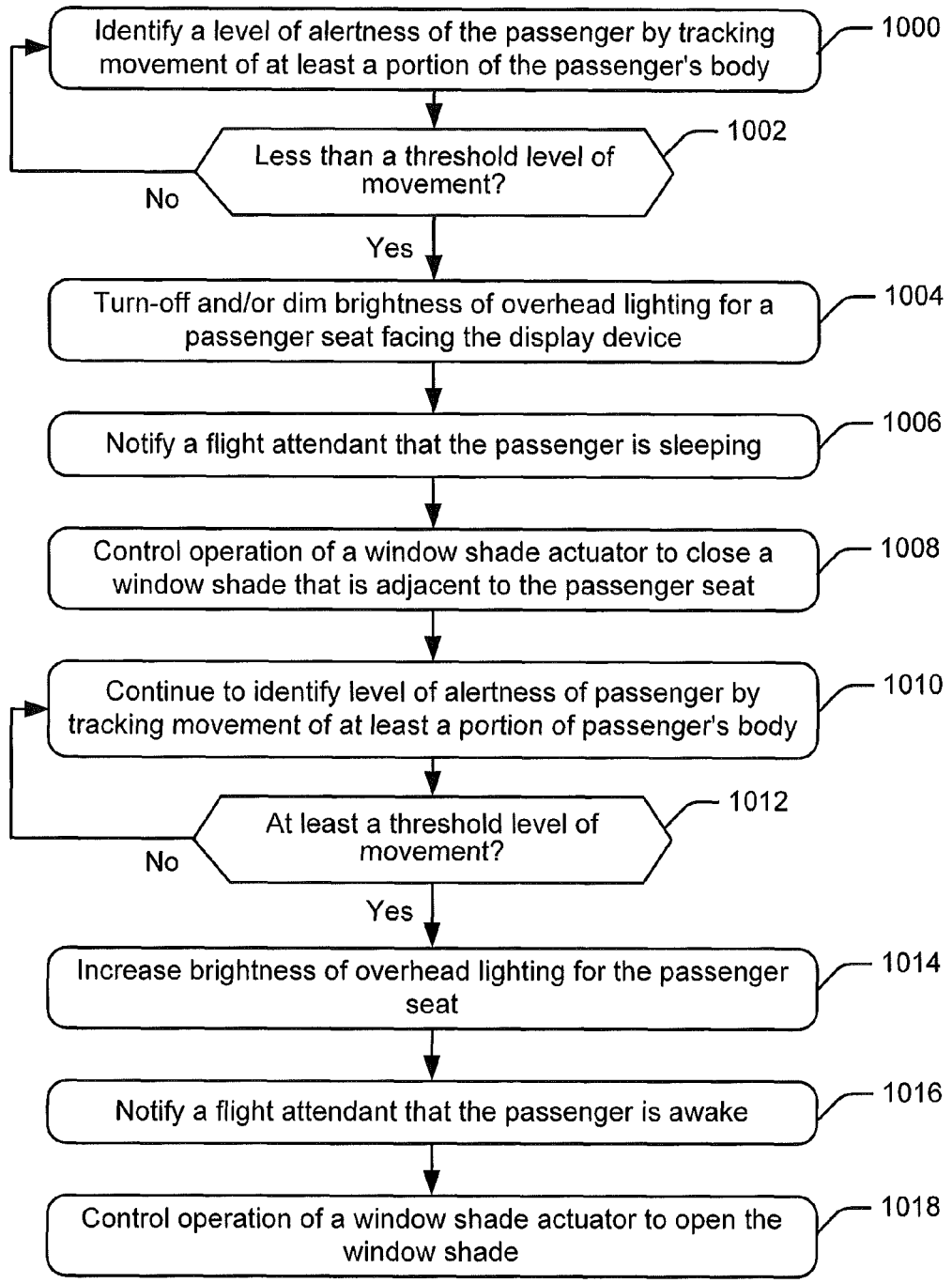
Figure 11:
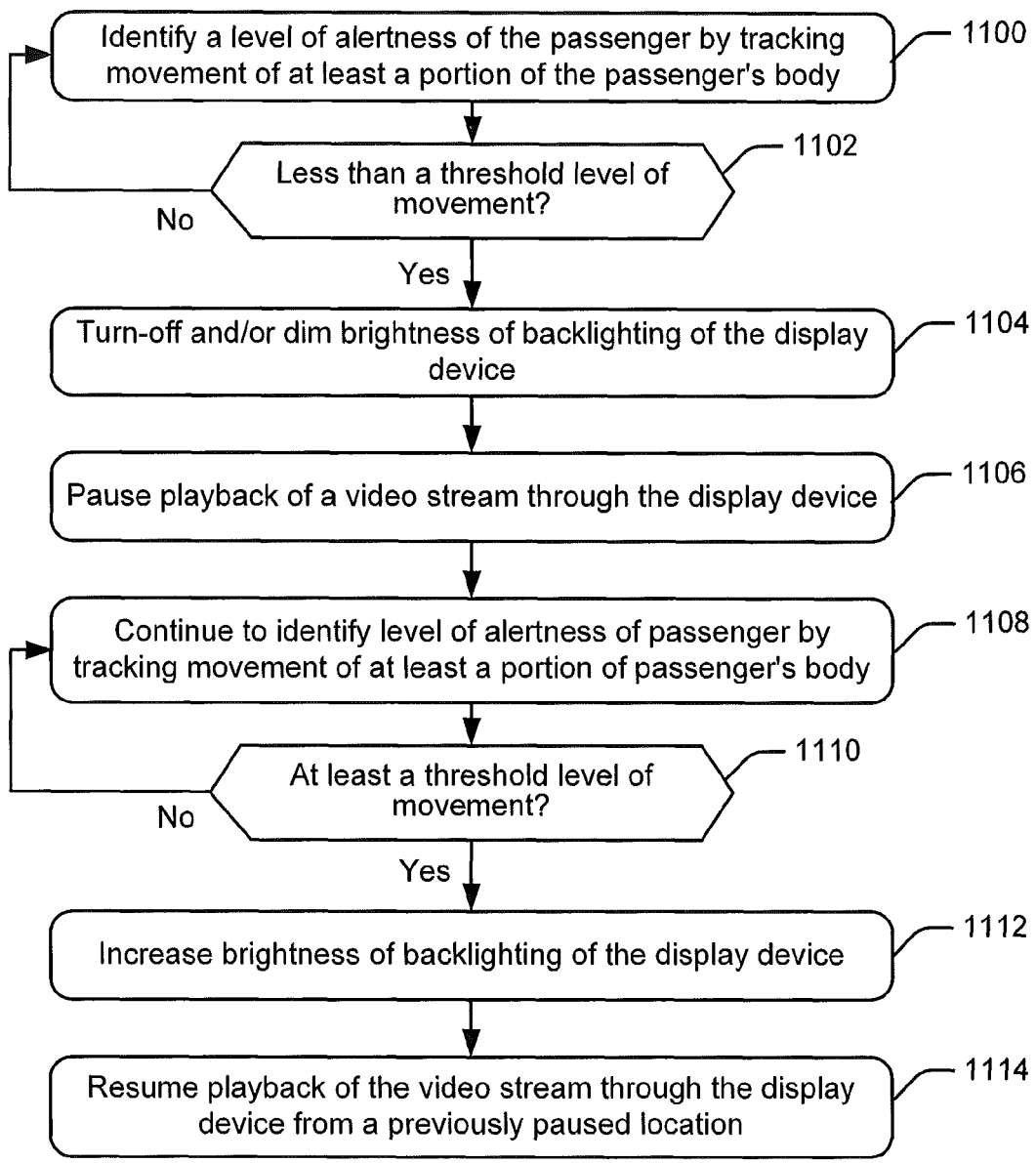
Figure 12:
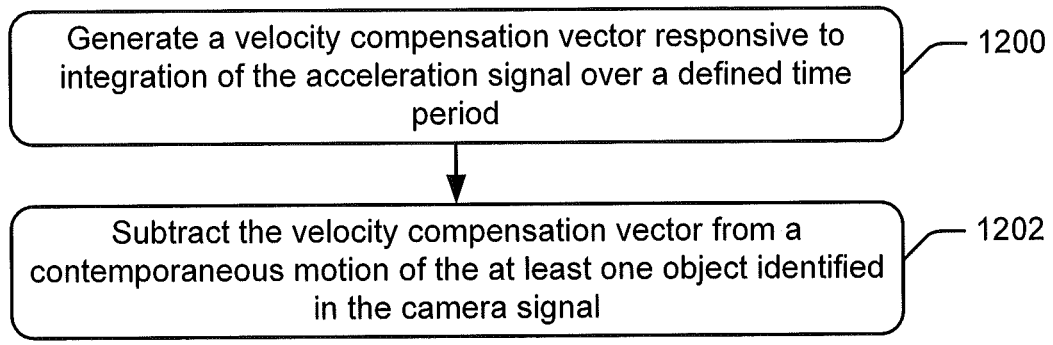

FIGS. 10 and 11 illustrate flowcharts of example operations and methods that may be performed to determine a level of alertness of a passenger and to control various operations of the SVDU 110 and/or other defined components/systems within an aircraft or other vehicle.

Referring to FIGS. 4 and 10, the processor 300 can identify (block 1000) a level of alertness of the passenger by tracking movement of at least a portion of the passenger's body. For example, it can determine (block 1002) when a passenger has maintained eyes closed and/or maintained hands/arms/head relatively motionless for at least a threshold time. In response to that determination, the processor 300 can carry-out sleep operations that are appropriate when the passenger is sleeping/resting.

The processor 300 may turn-off and/or dim brightness (block 1004) of the overhead lighting (810 in FIG. 8) for a passenger seat facing the display device 320, which can extend the life of the overhead lighting and avoid annoyance to the sleeping/resting passenger and/or adjacent passengers. The processor 300 may additionally or alternatively notify (block 1006) a flight attendant, via the flight attendant communication panel 812 or other communication terminal, that the passenger is sleeping/resting. The processor 300 may additionally or alternatively control (block 1008) operation of the window shade actuator (802 in FIG. 8) to close a window shade that is adjacent to the passenger seat to facilitate the passenger's sleep/rest.

The processor 300 continues to monitor and identify (block 1010) a level of alertness of the passenger by tracking movement of at least a portion of the passenger's body. In response to subsequently determining (block 1012) at least a threshold level of movement, the processor 300 may increase (block 1014) brightness of the overhead lighting (810 in FIG. 8), when the overhead lighting was on before the sleep operations. The processor 300 may additionally or alternatively notify (block 1016) a flight attendant, via the flight attendant communication panel 812 or other communication terminal, that the passenger is awake/active. The processor 300 may additionally or alternatively control (block 1018) operation of the window shade actuator (802 in FIG. 8) to open the window shade, when the window shade was open before the sleep operations.

Referring to FIGS. 4 and 11, in some other embodiments, the processor 300 can identify (block 1100) a level of alertness of the passenger by tracking movement of at least a portion of the passenger's body. For example, it can determine (block 1102) when a passenger has maintained eyes closed and/or maintained hands/arms/head relatively motionless for at least a threshold time. In response to that determination, the processor 300 can carry-out sleep the alternative or additional operations of FIG. 11 that are appropriate when the passenger is sleeping/resting.

The processor 300 may turn-off and/or dim brightness (block 1104) of backlighting of the display device 320, which can extend the life of the display device 320 and avoid annoyance to the sleeping/resting passenger and/or adjacent passengers. The processor 300 may additionally or alternatively pause playback of a video stream through the display device, which can avoid allowing the sleeping/resting passenger to miss watching a remaining portion of the video stream and avoid annoyance to the sleeping/resting passenger and/or adjacent passengers.

The processor 300 continues to monitor and identify (block 1108) a level of alertness of the passenger by tracking movement of at least a portion of the passenger's body. In response to subsequently determining (block 1110) at least a threshold level of movement, the processor 300 may increase (block 1112) brightness of the backlighting of the display device 320. The processor 300 may additionally or alternatively resume (block 1114) playback of the video stream through the display device 320 from a previously paused location (from block 1106).

Example Camera Operation:

In some embodiments, the camera 102 senses objects using frequencies in the visible light spectrum, while the other camera 104 senses objects using frequencies in the infra-red (IR) light spectrum. The processor 300 overlays images from the visible camera 102 and IR camera 104 to generate a three-dimensional map of objects.

For example, the IR camera 104 can include an IR emitter that emits modulated IR light toward the passenger, and the processor 300 may determine distance to an object using time-of-flight techniques and/or structured-light techniques.

The time-of-flight technique resolves distance based on the known speed of light, by measuring the round-trip time-of-flight of a light signal between a camera and objects within the field of view of the camera. In one embodiment, the light source 350a can be pulsed to illuminate the field of view of the camera, with the time-of-flight for reflections from illuminated objects indicating distance to those objects. In another embodiment, a narrow light source (e.g., laser) can be controlled to scan (e.g., raster scan) the field of view of the camera, point-by-point, to detect distances to each of the points.

The structured-light technique projects a known pattern pixels (e.g., grids or horizontal/vertical bars) toward the field of view of the camera, and observes the reflected pattern to identify distortion from other perspectives than that of the light source 350a. Distances to the objects and surface geometries of the objects can be determined responsive to the observed distortion in the reflected pattern.

The processor 300 can identify objects viewed by the visible light camera 102 using object recognition algorithms to identify fingers, hands, facial features, and body of the seated passenger. A three-dimensional map of identified objects can be generated by correlating the identified objects and the identified object ranges. The processor 300 can then track movement of particular objects, such as movement of fingers, hands, and/or facial features.

Because a passenger is seated when operating the SVDU 100, it can be particularly advantageous for the processor 300 to be configured to identify and track fine movement of fingers and hands in a relatively small gesture control space between the passenger's body and the SVDU 100, and to identify and track movement of defined facial features of the passenger (e.g., movement of eyes and/or mouth).

Moreover, because the passenger is seated, the processor 300 can calibrate its motion sensing operations for a relatively well defined gesture control space between the passenger's body and SVDU 100. Accordingly, the processor 300 may respond to a passenger becoming seated by performing an initial calibration to identify distance to the person's body (background) and identify objects in the foreground, such as the relative size and distances to fingers, hands, arms, and/or face. Because the seat can be reclined, changing the location and angle of the person relative to the SVDU 100, the processor 300 may be further configured to sense when the person's body (background) is moving backward/forward, and to respond by repeating the calibration. Repeating the calibration operation when the passenger's seat position changes can improve the accuracy with which the processor 300 can detect gestures by the passenger.

To facilitate operation of the IR camera 104, the SVDU 100 includes one or more infrared light sources 350a,b that are configured to illuminate the passenger gesture control space to enable the IR camera 104 to sense gestures that are being carried out by a passenger in an expected range of lighting situations, such as in near total-darkness when an aircraft cabin is darkened during late-night flights and is desirable to minimize overhead or other visible lighting to avoid nuisance to other passengers. An ambient light sensor 360 may be included to trigger the processor 300 or other circuitry to toggle the IR light source(s) 350 between on and off power states when the IR lighting is needed due to low ambient lighting, and/or to control brightness of the IR light source(s) 350 responsive to level of ambient lighting sensed by the ambient light sensor 360.

Compensating for Turbulence Effects on Passenger's Gestures:

In an aircraft or other vehicle environment, the passenger may experience vibration or other turbulence that can cause an extended hand to move relatively uncontrollably. While an aircraft is experiencing turbulence, for example, it may not be possible for a passenger to point in a steady manner at a menu item on the display 320 that the passenger wants the processor 300 to select for operation, and it may be similarly difficult for the passenger to accurately form a motion (e.g., horizontal sweeping motion) for a control gesture to control the SVDU 100 in a desired manner. It is therefore possible for turbulence to cause shaking or other undesired movement of a person's hand, arm, etc., that can cause the processor 300 to misinterpret a gesture that the passenger is attempting to create and, thereby, trigger undesired operational change to the SVDU 100 and/or other controlled components/systems within the aircraft.

In accordance with some embodiments, the SVDU 100 includes an acceleration sensor 370 that senses acceleration of the SVDU 100 to output an acceleration signal. The acceleration sensor 370 may include a single accelerometer or a plurality of accelerometers that are arranged to measure translational and/or rotational acceleration relative to a plurality of orthogonal axes.

The processor 300 is configured to compensate the shape of motions that are forming a gesture as sensed by the cameras 102 and 104 to reduce or eliminate effects of the sensed acceleration on the sensed gesture. In one embodiment illustrated in FIG. 12, the processor 300 is configured to generate (block 1200) a velocity compensation vector responsive to integration of the acceleration signal over a defined time period, and subtracting (block 1202) the velocity compensation vector from a contemporaneously sensed motion of the at least one object identified in the camera signal.

For example, when the processor 300 identifies a hand motion that is primarily horizontal but which also includes a vertical component, the processor 300 may ignore the vertical component when the acceleration signal indicates that the SVDU 100 (and thereby the passenger) is experiencing vertical acceleration having a magnitude that can cause the amount of sensed vertical component motion of the hand.

The processor 300 may thereby use the acceleration signal to compensate for unsteadiness in a passenger's finger by, for example, subtracting the velocity compensation vector from the sensed finger velocity to output a relatively steady location on the display 320 where the passenger is attempting to point using the finger. Similarly, the processor 300 may properly interpret a gesture by the passenger that has been misformed due to the effect of acceleration, by subtracting the velocity compensation vector from the observed motion of the passenger's hand(s) to output a gesture shape that corresponds more accurately to the gesture that the passenger intended to generate.

Figure 13:
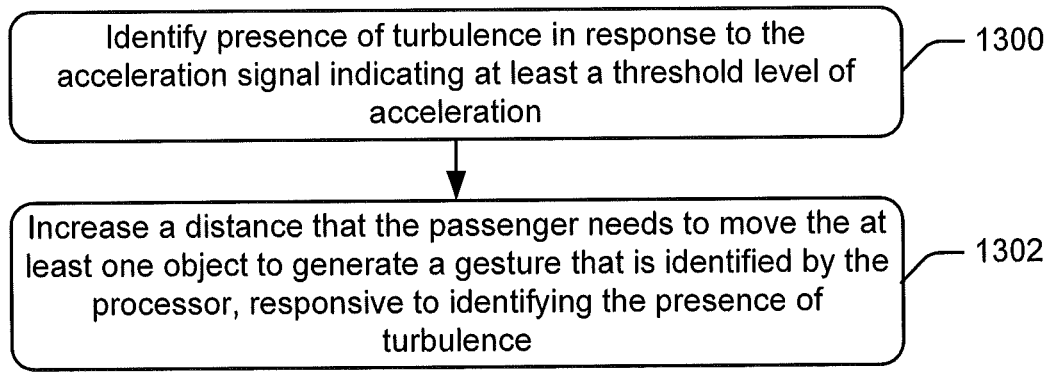

In the embodiment of FIG. 13, the processor 300 can identify (block 1300) the presence of turbulence in response to the acceleration signal indicating at least a threshold level of acceleration, and can increase (block 1302) a distance that the passenger needs to move one or more objects to form a gesture that is identifiable by the processor 300. Thus, when a gesture can be formed by moving an object through one or more paths over a first distance to trigger a match to a gesture in the gesture library 314 while the aircraft is not subjected to turbulence, the same gesture would need to be formed by moving the object through the similar one or more paths but over a greater second distance when the aircraft is subjected to turbulence. Requiring the passenger to use larger motions while the aircraft is subjected to turbulence may reduce the effect of turbulence induced shaking of the passenger's hand or other object while forming a gesture.

For example, without turbulence a passenger could use a circle gesture with a first radius to trigger a match to a gesture in the gesture library 314. In contrast, with turbulence the passenger would need to increase the radius of the circle at least a defined distance to trigger a match to the same gesture in the gesture library 314.

One or more of these embodiments may enable more accurate gesture-based control of the SVDU 100 while the passenger and SVDU 100 are subjected to turbulence or other sources of acceleration.

Controlling the Passenger's Gesture Control Space

When the SVDU 100 is used in an aircraft environment and installed in a seatback facing a person, the person is practically limited to making control gestures within a relatively close space between the person's body and the SVDU 100. Accordingly, certain advantages may be provided by configuring the SVDU 100 to ignore movement that occurs outside that space, to avoid erroneously interpreting as a valid passenger's gesture command the movements by adjacent passengers, passengers behind the intended passenger, a flight attendant attending to adjacent passengers, and/or movements of passengers traveling along an adjacent aisle or across an adjacent row.

Spaced Apart Gesture Control Cameras Tilted Toward Each Other

Figure 5:
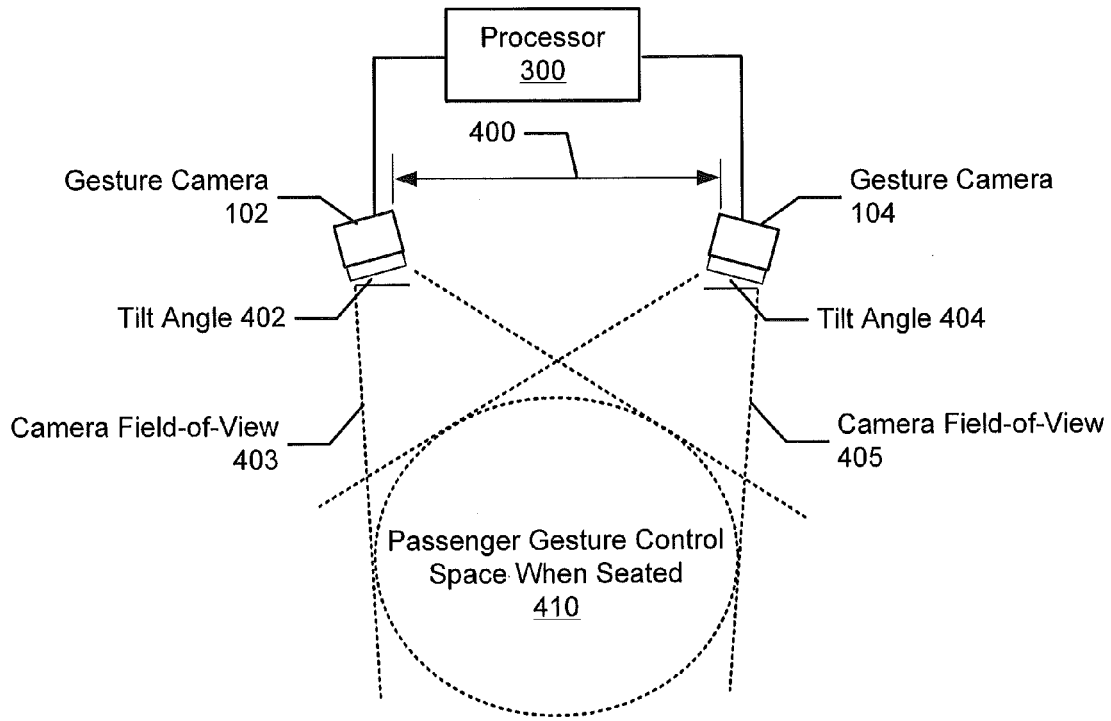
FIG. 5 is a block diagram of a pair of gesture control cameras which are tilted toward each other to provide a narrowed overlapping field of view which defines a passenger gesture space configured according to some embodiments of the present invention.

FIG. 5 is a block diagram of the cameras 102 and 104 which are spaced apart from each other by a distance 400 across a front face of the SVDU 100. The cameras 102 and 104 are tilted toward each other with respective angles 402 and 404 to provide a narrowed overlapping field of view, 403 and 405 respectively. The processor 300 is connected to receive video images from the cameras 102 and 104, and is configured to identify control gestures that are formed by a passenger within a gesture control space 410 that is between the passenger and the SVDU 100 and defined by the narrowed overlapping field of views of the cameras 102 and 104. When performing operations and methods to identify potential control gestures, the processor 300 may ignore movement that occurs within the field of view of only one, but not both, of the cameras 102 and 104.

Thus, for example, when a first passenger who is seated in front of the SVDU 100 makes a gesture by moving one or both hands through the gesture control space 410 in front of the SVDU 100, both cameras 102 and 104 observe the gesture and the processor 300 responds by measuring the depth of objects, identifying the objects, identify a gesture made by movement of the object(s). When the gesture matches one of the predefined gestures known to the processor 300, the processor 300 selects a corresponding command which is carried out to control the SVDU 100 and/or other defined components/systems within the aircraft.

In contrast, when a second passenger, who is seated to the left of the gesture control space 410, reaches for a drink on a forward tray or makes another motion, the camera 104 observes the motion while the oppositely tilted camera 102 does not observe the motion. Because only camera 104 observed the motion, the processor 300 ignores the motion by not attempting to match the motion to the predefined gestures. Similarly, when a passenger travels along an aisle adjacent to the right of the gesture control space 410, the camera 102 observes the motion while the oppositely tilted camera 104 does not observe the motion, and the processor 300 responds by ignoring the motion.

The distance 400 between the cameras 102 and 104 is selected to control a size of the gesture control space 410 to be appropriate for use by a passenger who is seated in front of the SVDU 100 (e.g., when the passenger is seated at a distance of two to ten feet from the SVDU 100). The distance 400 is further selected to limit the size of the gesture control space 410 to avoid excessive overlap with other gesture control spaces used to control SVDUs at adjacent seats and to ignore movement along any adjacent aisle. Because the cameras 102 and 104 are tilted toward each other, the distance 400 may locate the cameras 102 and 104 near opposite sides of the SVDU 100, although other distances between the cameras 102 and 104 may be used with the tilt angles 402 and 404 being correspondingly adjusted to provide a desired size for the gesture control space 410.

Gesture Control Cameras Tilted Away From Each Other

Figure 6:
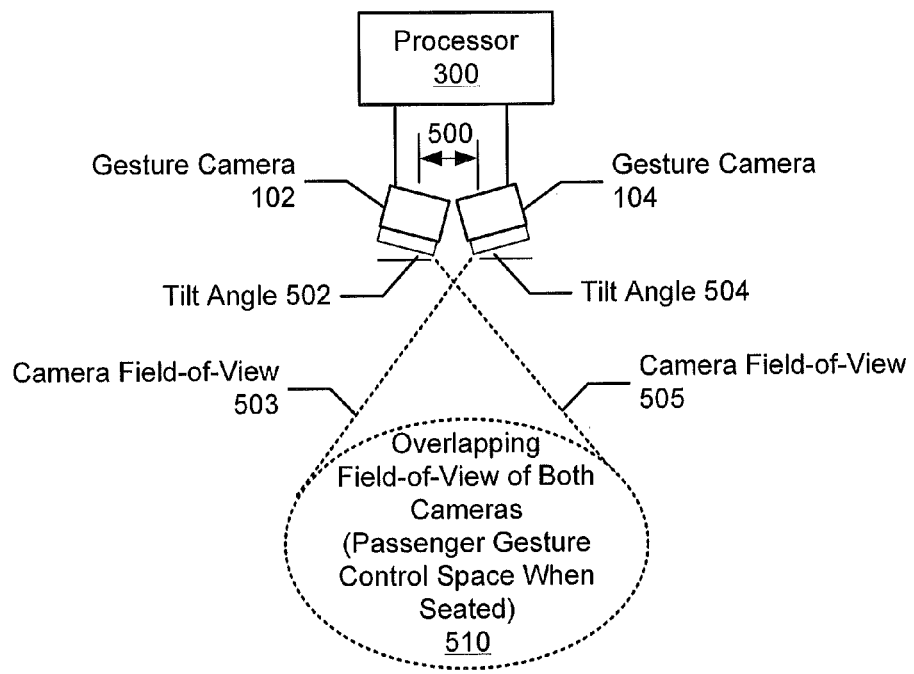
FIG. 6 is a block diagram of a pair of gesture control cameras which are closely spaced and tilted away from each other to provide a narrowed overlapping field of view which defines a passenger gesture space configured according to some embodiments of the present invention.

FIG. 6 is a block diagram of the pair of cameras 102 and 104 which are now closely spaced relative to each other at a distance 500 across the front face of the SVDU 100. The cameras 102 and 104 are tilted away from each other with respective angles 502 and 504 to provide a narrowed overlapping field of view 503 and 505, respectively. The processor 300 is connected to receive video images from the cameras 102 and 104, and is configured to identify control gestures that are formed by a passenger within a gesture control space 510 between the passenger and the SVDU 100 and defined by the narrowed overlapping field of views of the cameras 102 and 104. When performing operations and methods to identify potential control gestures, the processor 300 may ignore movement that occurs within the field of view of only one, but not both, of the cameras 102 and 104.

The distance 500 between the cameras 102 and 104 is selected to control a size of the space 510 to be appropriate for use by a passenger who is seated in front of the SVDU 100, while also limiting the size of the gesture control space 510 to avoid excessive overlap with gesture control spaces used to control SVDUs at adjacent seats and to ignore movement along any adjacent aisle. Because the cameras 102 and 104 are tilted away from each other, the distance 500 should be smaller, and may be much smaller, than the distance 300 between the cameras 102 and 104 of FIG. 5 which are titled toward each other. For example, the distance 510 may place the cameras 102 and 104 immediately adjacent to each other or may space the cameras 102 and 104 apart by less than, for example, four inches. Other distances between the cameras 102 and 104 may be used with the tilt angles 502 and 504 being correspondingly adjusted to provide a desired size for the gesture control space 510.

Thus, for example, when a first passenger who is seated in front of the SVDU 100 makes a gesture by moving one or both hands through the gesture control space 510 in front of the SVDU 100, both cameras 102 and 104 observe the gesture and the processor 300 responds by analyzing the gesture. When the gesture matches one of the predefined gestures known to the processor 300, the processor 300 selects a corresponding command which is carried out to control the SVDU 100.

In contrast, when a second passenger, who is seated to the left of the gesture control space 510, reaches for a drink on a forward tray or makes another motion, the camera 104 observes the motion while the oppositely tilted camera 102 does not observe the motion. Because only camera 104 observed the motion, the processor 300 ignores the motion by not attempting to match the motion to the predefined gestures. Similarly, when a passenger travels along an aisle adjacent to the right of the gesture control space 510, the camera 102 observes the motion while the oppositely tilted camera 104 does not observe the motion, and the processor 300 responds by ignoring the motion.

The processor 300 also identifies and operates to ignore movement of other portions of the passenger, such as the passenger's stomach, chest, and knees that may into the field of the view of the cameras 102 and 104 while the passenger is seated.

Controlling Depth of Focus of the Control Cameras

Figure 7:
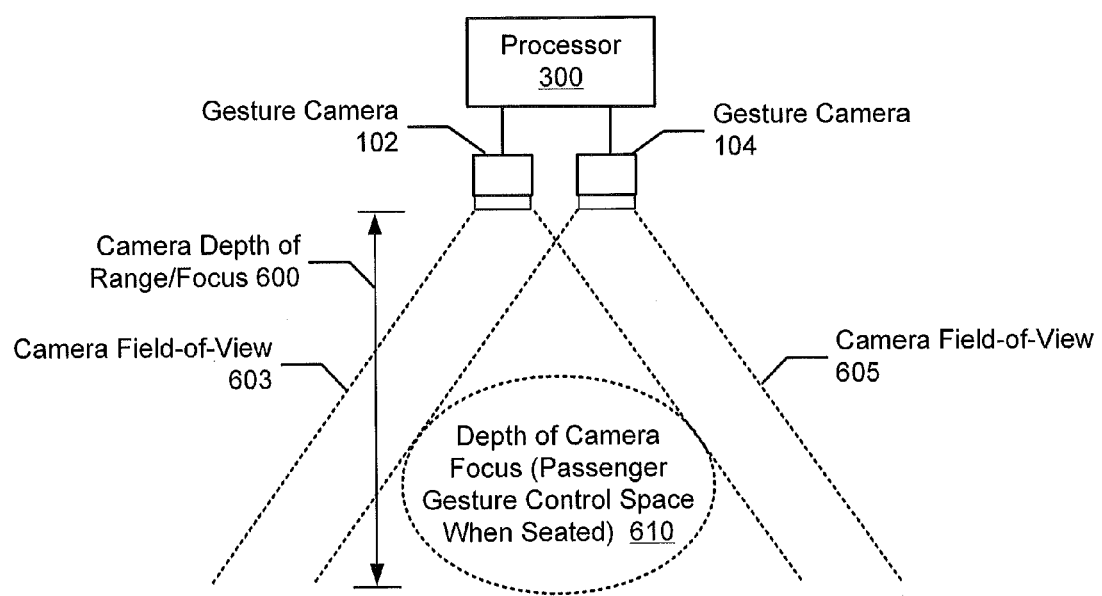
FIG. 7 is a block diagram of a pair of gesture control cameras having a restricted depth of focus to provide a passenger gesture space configured according to some embodiments of the present invention.

FIG. 7 is a block diagram of a pair of the gesture control cameras 102 and 104 which are position along the front face of the SVDU 100 to provide partially overlapping field of views 603 and 605, respectively. The range/depth of focus 600 of the cameras 102 and 104 is controlled to provide a desired size for a passenger's gesture control space 610. The processor 300 may use the range information obtained by IR imaging through the IR camera 104 to track objects that are within a threshold distance of the cameras 102,104 (foreground objects) while ignoring objects beyond that threshold distance (background objects).

In another embodiment, the depth of focus 600 may be controlled by using one or more lenses on the cameras 102 and 104, or using other techniques, that restrict how far away an object can be positioned while being defined by a threshold level of sharpness (e.g., object edges have a threshold sharpness, edges are not blurred by more than a defined number of pixels, etc) in video images output by the cameras 102 and 104.

The processor 300 is connected to receive video images from the cameras 102 and 104, and is configured to identify control gestures that are formed by a passenger within the gesture control space 610. The gesture control space 610 is defined by the overlapping camera field of views 603 and 605 and is further defined by a range of in-focus objects within the constrained range/depth of focus 600 of the cameras 102 and 104. When performing operations and methods to identify potential control gestures, the processor 300 may ignore movement that occurs within the field of view of only one but not both of the cameras 102 and 104, and may further ignore object movement that is beyond a threshold distance of the cameras 102,104 although being within the field of view of both of the cameras 102 and 104.

Thus, for example, when a first passenger who is seated in front of the SVDU 100 makes a gesture by moving one or both hands through the gesture control space 610 in front of the SVDU 100, both cameras 102 and 104 observe the gesture, the processor 300 determines that the object making the gesture is within the range depth of focus 600 (e.g., using ranging information and/or a threshold level of sharpness), and the processor 300 responds by analyzing the gesture. When the gesture matches one of the predefined gestures, the processor 300 selects a corresponding command which is carried out to control the SVDU 100.

In contrast, when a second passenger, who is seated behind the first passenger moves across the field of view of the cameras 102 and 104 toward/away from the aisle, both cameras 102 and 104 observe the motion. However, the processor 300 determines that the second passenger is located beyond the range/depth of focus 600, and responds by ignoring the motion by not attempting to match the motion to the predefined gestures. Similarly, when a passenger travels along an aisle adjacent to either side and within the field of view of both cameras 102 and 104, the processor 300 determines that the passenger is located beyond the range/depth of focus 600 and responds by ignoring the motion.

FURTHER DEFINITIONS AND EMBODIMENTS

In the above-description of various embodiments of the present invention, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When an element is referred to as being "connected", "coupled", "responsive", or variants thereof to another node, it can be directly connected, coupled, or responsive to the other element or intervening element may be present. In contrast, when an element is referred to as being "directly connected", "directly coupled", "directly responsive", or variants thereof to another element, there are no intervening element present. Like numbers refer to like element throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/BlueRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the present invention may be embodied in hardware and/or in software (including firmware, resident software, micro-code, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner and process of making and using them, and shall support claims to any such combination or subcombination.

Many variations and modifications can be made to the embodiments without substantially departing from the principles of the present invention. All such variations and modifications are intended to be included herein within the scope of the present invention.

What is claimed:

1. A vehicle entertainment system, comprising:
a display device;
at least one gesture control camera configured to generate a camera signal responsive to light reflected from at least one object within a field of view of the at least one gesture control camera; and
a processor configured to:
analyze the camera signal to identify a gesture made by a passenger moving the at least one object,
control at least one operation of the vehicle entertainment system responsive to the identified gesture,
respond to an indication that the passenger has becoming seated in a seat facing the display device by performing an initial calibration to identify a distance to the passenger's body and identify locations of at least one object in the foreground between the passenger's body and the at least one gesture control camera, and
determine when the passenger's body has moved at least a threshold distance away from or toward the at least one gesture control camera while remaining seated, and
respond to the determination by performing a calibration to identify a distance to the passenger's body and identify locations of at least one object in the foreground between the passenger's body and the at least one gesture control camera.

2. The vehicle entertainment system of claim 1,
further comprising a gesture library that identifies a plurality of different movement gestures and associated commands; and
wherein the processor is configured to:
track movement of the at least one object;
match the tracked movement to one of the plurality of different movement gestures in the gesture library;
identify the command that is associated with the matched movement gesture; and
perform the associated command to control an operation of the vehicle entertainment system.

3. The vehicle entertainment system of claim 2, wherein the processor is configured to access the gesture library to identify and then perform one of the following commands to control the vehicle entertainment system:
select one of a plurality of menu item indicia that are displayed on the display device to cause indicia for sub-menu items to be displayed on the display device;
select one of a plurality of movie indicia that are displayed on the display device to initiate playing of an associated movie on the display device;
select one of a plurality of application indicia that are displayed on the display device to initiate execution of an associated application by the processor;
control audio volume through an audio interface of the vehicle entertainment system;
control playing, pausing, fast forwarding, and/or rewinding of a movie on the display device; and/or
control operation of a game being executed by the processor.

4. The vehicle entertainment system of claim 2, wherein the processor is configured to access the gesture library to identify and then perform one of the following commands:
control a recline actuator to regulate a recline angle of a passenger seat facing the display device;
control a massage actuator within the passenger seat; and/or
control a foot rest actuator to regulate a position of a foot rest of the passenger seat.

5. The vehicle entertainment system of claim 2, wherein the processor is configured to access the gesture library to identify and then perform one of the following commands:
control operation of a window shade actuator to open and close a window shade that is adjacent to a passenger seat facing the display device;
control overhead lighting for the passenger seat;
control a passenger service function within an aircraft vehicle; and/or
control communication of requests and/or responses to a flight attendant communication panel and/or terminal of an aircraft vehicle.

6. The vehicle entertainment system of claim 2, wherein the processor is configured to access the gesture library to identify one of the plurality of different movement gestures and associated commands by:
determining a location on the display device where a passenger's finger and/or hand is pointed;
distinguishing between swiping motions at different defined angles made by the passenger's finger and/or hand relative to the display device;
identifying changing distances between two or more fingers or between a pair of hands that are held in front of the display device; and/or
identifying rotation of two or more fingers or rotation of a hand in front of the display device.

7. The vehicle entertainment system of claim 1, wherein the processor is configured to:
scroll in a defined direction a list of menu items that is displayed on the display device in response to tracking movement as a hand or finger swipes in a corresponding direction relative to the display device; and
select one of the displayed menu items in response to detecting that a finger is pointed at a location on the display device where the menu item is displayed.

8. The vehicle entertainment system of claim 1, wherein the processor is configured to:
identify a level of alertness of the passenger by tracking movement of at least a portion of the passenger's body;
respond to tracking less than a threshold level of movement by performing at least one of the following commands to control the vehicle entertainment system:
turn-off and/or dim brightness of overhead lighting for a passenger seat facing the display device;
notify a flight attendant that the passenger is sleeping; and/or
control operation of a window shade actuator to close a window shade that is adjacent to the passenger seat; and
respond to tracking more than the threshold level of movement by performing at least one of the following commands to control the vehicle entertainment system:
increase brightness of the overhead lighting;
notify a flight attendant that the passenger is awake; and/or
control operation of a window shade actuator to open the window shade.

9. The vehicle entertainment system of claim 1, wherein the processor is configured to:
identify a level of alertness of the passenger by tracking movement of at least a portion of the passenger's body;
respond to tracking less than a threshold level of movement by performing at least one of the following commands to control the vehicle entertainment system:
turn-off and/or dim brightness of backlighting of the display device; and pause playback of a video stream through the display device; and respond to tracking more than the threshold level of movement by performing at least one of the following commands to control the vehicle entertainment system:

increase brightness of backlighting of the display device; and resuming playback of the video stream through the display device from a previously paused location.

10. The vehicle entertainment system of claim 1, wherein:

the at least one gesture control camera comprises a pair of gesture control cameras that are spaced apart from each other and directed to provide an overlapping field of view in an area in front of the display device for sensing the at least one object moved by the passenger;

each of the gesture control cameras includes at least one lens that is configured to restrict the depth of focus to a defined distance from the gesture control camera to create a passenger gesture control space within which object movement is tracked by the processor and outside of which object movement is not tracked by the processor when identifying a gesture made by the passenger.

11. A vehicle entertainment system, comprising:

a display device;

at least one gesture control camera configured to generate a camera signal responsive to light reflected from at least one object within a field of view of the at least one gesture control camera;

an acceleration sensor that outputs an acceleration signal that indicates a level of acceleration of the vehicle entertainment system; and a processor configured to:

analyze the camera signal to identify a gesture made by a passenger moving the at least one object, control at least one operation of the vehicle entertainment system responsive to the identified gesture, and use the acceleration signal to at least partially compensate for effect of acceleration on the at least one object moved by the passenger when identifying the gesture made by the passenger, by identifying presence of turbulence in response to the acceleration signal indicating at least a threshold level of acceleration; and increasing a distance that the passenger needs to move the at least one object to generate a gesture that is identified by the processor, responsive to identifying the presence of turbulence.

12. The vehicle entertainment system of claim 11, wherein the processor is further configured to:

generate a velocity compensation vector responsive to integration of the acceleration signal over a defined time period; and subtract the velocity compensation vector from a contemporaneous motion of the at least one object identified in the camera signal.

13. A vehicle entertainment system, comprising:

a display device;

a pair of gesture control cameras each configured to generate a camera signal responsive to light reflected from at least one object within a field of view of the gesture control camera, the pair of gesture control cameras are spaced apart from each other and tilted toward each other to provide a narrowed overlapping field of view in front of the display device for sensing the at least one object moved by a passenger when identifying a gesture made by the passenger; and a processor configured to:

analyze the camera signals from the pair of gesture control cameras to identify a gesture made by the passenger moving the at least one object, control at least one operation of the vehicle entertainment system responsive to the identified gesture, and ignore movement that occurs within the field of view of only one, but not both, of the pair of gesture control cameras when identifying the gesture made by the passenger.

14. The vehicle entertainment system of claim 13, wherein:

the pair of gesture control cameras are spaced apart horizontally across a face of a housing that surrounds side surfaces of the display device, and are located on opposite sides of and equally distant from a vertical centerline of the display device.

15. A vehicle entertainment system, comprising:

a display device;

a pair of gesture control cameras each configured to generate a camera signal responsive to light reflected from at least one object within a field of view of the gesture control camera, the pair of gesture control cameras are spaced apart from each other and tilted away from each other to provide a narrowed overlapping field of view in front of the display device for sensing the at least one object moved by a passenger when identifying a gesture made by the passenger; and a processor configured to:

analyze the camera signals from the pair of gesture control cameras to identify a gesture made by the passenger moving the at least one object, control at least one operation of the vehicle entertainment system responsive to the identified gesture, and ignore movement that occurs within the field of view of only one, but not both, of the pair of gesture control cameras when identifying the gesture made by the passenger.

16. The vehicle entertainment system of claim 15, wherein:

the pair of gesture control cameras are spaced apart less than 4 inches from each other and are located on opposite sides of and equally distant from a vertical centerline of the display device.

17. A vehicle entertainment system, comprising:

a display device;

a pair of gesture control cameras each configured to generate a camera signal responsive to light reflected from at least one object within a field of view of the gesture control camera, the pair of gesture control cameras are spaced apart from each other; and a processor configured to:

analyze the camera signals from the pair of gesture control cameras to identify a gesture made by a passenger moving the at least one object, control at least one operation of the vehicle entertainment system responsive to the identified gesture, and determine distance between the at least one object and the pair of gesture control camera, to ignore object movement that occurs within the field of view of only one but not both of the gesture control cameras when identifying a gesture made by the passenger, and to further ignore object movement that is beyond a threshold distance of the gesture control cameras although being within the field of view of both of the gesture control cameras when identifying a gesture made by the passenger.

* * * * *